United States Patent [19]
Friend et al.

[11] Patent Number: 6,047,970
[45] Date of Patent: Apr. 11, 2000

[54] ROD SCRAPER

[75] Inventors: Anthony D. Friend; Mark J. Kiesel, both of Peoria, Ill.

[73] Assignee: Caterpillar Inc., Peoria, Ill.

[21] Appl. No.: 08/995,817

[22] Filed: Dec. 22, 1997

[51] Int. Cl.[7] .................................................. B08B 17/02
[52] U.S. Cl. ........................ 277/550; 277/560; 277/549; 277/553
[58] Field of Search ................................. 277/550, 553, 277/560, 549

[56] References Cited

U.S. PATENT DOCUMENTS

| | | | |
|---|---|---|---|
| 2,590,696 | 3/1952 | Gregoire | 277/553 |
| 4,461,486 | 7/1984 | Tregonning . | |
| 4,469,336 | 9/1984 | Linne . | |
| 4,534,239 | 8/1985 | Heimann | 277/550 |
| 4,577,363 | 3/1986 | Wyse . | |
| 5,460,678 | 10/1995 | Reinsma et al. . | |

*Primary Examiner*—James R. Brittain
*Assistant Examiner*—Desmond Peyton
*Attorney, Agent, or Firm*—Haverstock, Garrett & Roberts; J. W. Burrows

[57] ABSTRACT

A rod scraper for hydraulic cylinders and the like is disclosed which includes an elastomeric ring member having an inner surface defining a central aperture adapted for receiving a rod for axial movement relative thereto, the inner surface including a scraper portion having an inner most circumferential lip positioned adjacent one end of the elastomeric seal member for scraping the rod, the elastomeric ring member further having a curved outer surface portion generally axially coextensive with the scraper portion, and a metallic backing ring affixed in overlaying relation to at least a substantial portion of the curved outer surface portion of the elastomeric ring member, the backing ring being resiliently biased against the curved outer surface portion to urge the lip of the elastomeric ring member against the rod and sufficiently flexible to allow some radial movement of the rod while maintaining the lip in circumferential contact with the rod.

6 Claims, 2 Drawing Sheets

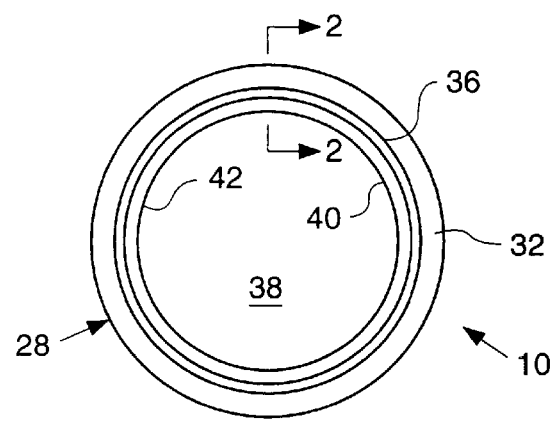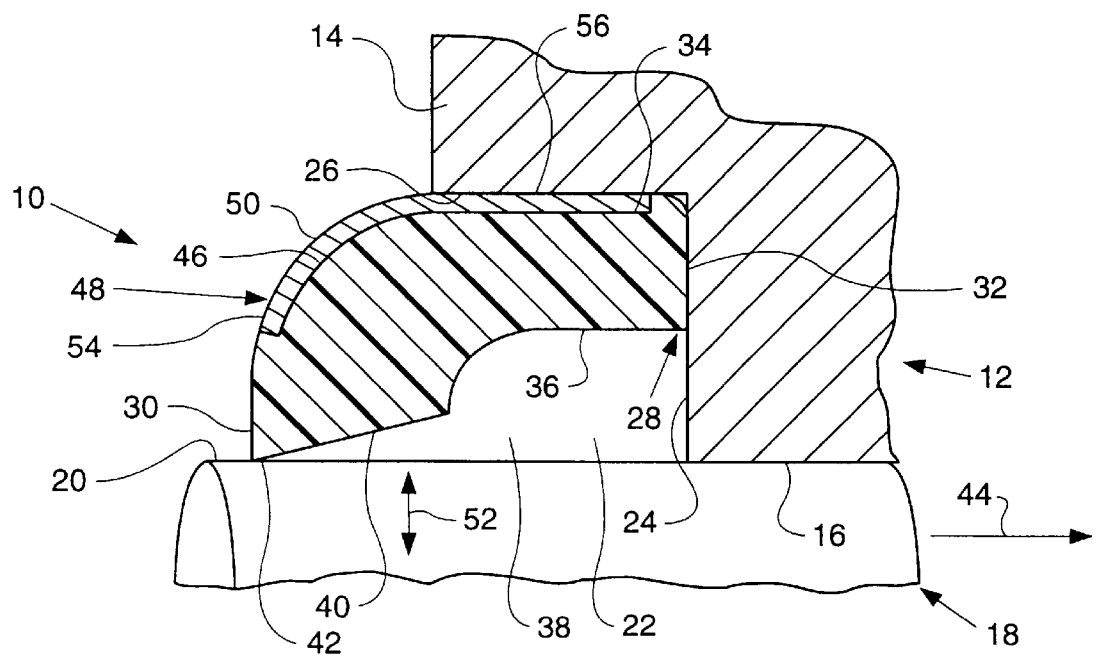

Fig_3
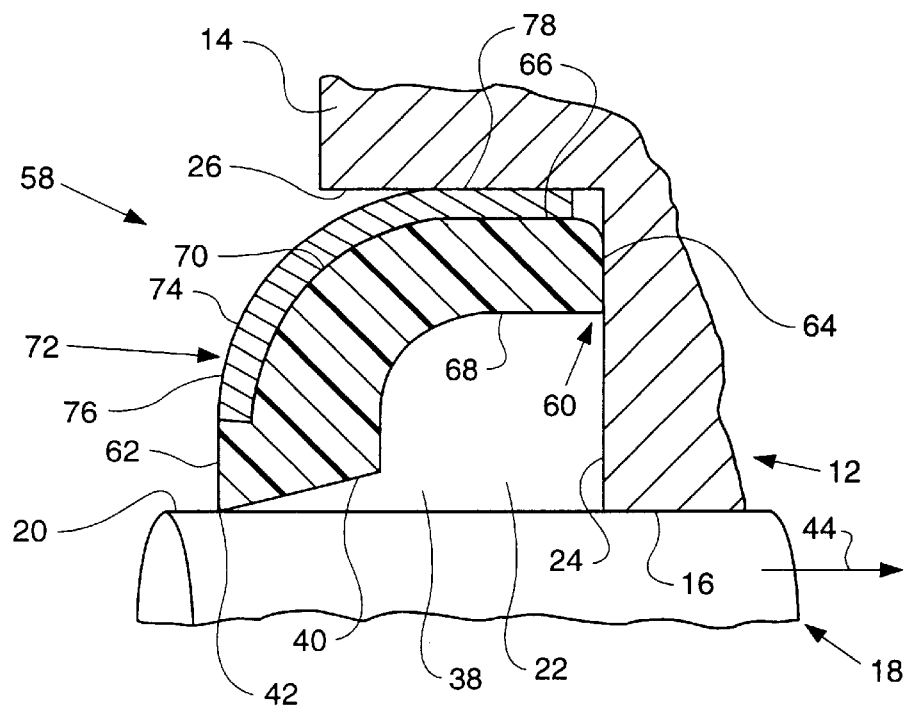
Fig_4
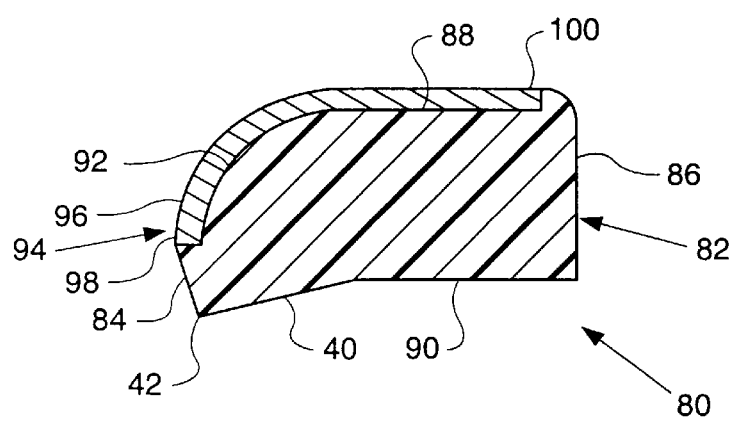

ROD SCRAPER

TECHNICAL FIELD

This invention relates generally to rod scrapers, and more particularly, to rod scrapers for hydraulic cylinders.

BACKGROUND ART

Currently known rod scraper constructions for hydraulic cylinders and the like typically utilize an elastomeric or metallic ring having at least one circumferential lip positioned for scraping a rod or other member movable axially through an aperture defined by the ring. Reference, for example, Tregonning, U.S. Pat. No. 4,461,486, issued Jul. 24, 1984; and Wyse, U.S. Pat. No. 4,577,363, issued Mar. 25, 1986. Reference also similar sealing ring constructions disclosed in Linne, U.S. Pat. No. 4,469,336, issued Sep. 4, 1984 to Caterpillar Tractor Co.; Reinsma et al., U.S. Pat. No. 5,460,678, issued Oct. 24, 1995 to Caterpillar Inc.; and dust seals available from Nok Corporation of Tokyo, Japan.

Problems encountered when using currently known rod scraper constructions include debris accumulation around the rod scraper lip that can ingress into the hydraulic cylinder as the rod or other member is retracted therein. Such debris that enters the cylinder can cause deterioration of primary seals located in the cylinder which can ultimately lead to rod and/or cylinder damage and possibly failure.

Additionally, rod scrapers having multiple circumferential lips have been found to have a tendency to trap oil that leaks outwardly past the primary seals of a hydraulic cylinder, which trapped oil when pressurized can force the rod scraper from its mounted position in a stepped opening or other location on the hydraulic cylinder head or other member.

Accordingly, the present invention is directed to overcoming one or more of the problems as set forth above.

DISCLOSURE OF THE INVENTION

In one embodiment of the present invention a rod scraper for hydraulic cylinders and the like is disclosed, which rod scraper includes an elastomeric ring member having a first axial end portion, an opposite second axial end portion, a radial outer surface, and a radial inner surface, the radial inner surface defining a central aperture extending axially through the elastomeric ring member adapted for receiving a rod or other member for axial movement relative thereto, the radial inner surface including a scraper portion extending radially inwardly into the central aperture, the scraper portion including a radial inner most circumferential lip positioned adjacent to the first axial end portion of the elastomeric ring member for scraping the rod when moved axially relative thereto, the outer surface of the elastomeric ring member including a curved portion generally axially coextensive with the scraper portion, and a metallic backing ring affixed to the outer surface of the elastomeric ring member, which backing ring has a curved portion located in overlaying relation to at least a substantial portion of the curved portion of the outer surface of the elastomeric ring member, the curved portion of the backing ring being resiliently biased against the curved portion of the outer surface of the elastomeric ring member to urge the radial inner most circumferential lip of the elastomeric ring member against the rod or other member.

The curved backing ring portion biased against the elastomeric ring member of the present rod scraper is designed to provide superior scraping characteristics, and along with the elastomeric ring member, is sufficiently flexible to allow radial movement of the rod or other member while still maintaining substantial circumferential scraping contact between the scraper portion and the outer surface thereof. Additionally, since the curved outer surface portion of the elastomeric ring member is axially coextensive with the scraper portion, and the backing ring overlays the curved portion, the scraper portion is covered and protected by the backing ring from substantial contact by large debris located on the rod as it is retracted into the cylinder. Furthermore, the single scraper portion of the present construction eliminates the problem of oil trapped between multiple lips of other rod scraper constructions that can force the rod scraper out of its mounted position in a cylinder head or other portion of a hydraulic cylinder.

BRIEF DESCRIPTION OF DRAWINGS

FIG. 1 is an end view of a rod scraper according to the present invention;

FIG. 2 is a cross sectional view of the rod scraper taken along lines 2—2 of FIG. 1, showing the rod scraper installed in a stepped opening in a cylinder head of a hydraulic cylinder in position for scraping a rod extending through an aperture of the rod scraper and movable axially relative thereto;

FIG. 3 is a cross-sectional view of another rod scraper according to the present invention, showing the rod scraper installed in a stepped opening in the cylinder head of the hydraulic cylinder of FIG. 2 in position for scraping a rod extending through the aperture of the rod scraper; and FIG. 4 is a cross-sectional view of still another rod scraper according to the present invention.

BEST MODE FOR CARRYING OUT THE INVENTION

Referring to the drawings, FIGS. 1 and 2 show a rod scraper 10 constructed and operable according to the teachings of the present invention. Rod scraper 10 is adapted to be installed in a wide variety of hydraulic cylinders in position for scraping the outer circumferential surface of a rod or other member axially movable relative to the cylinder, FIG. 2 showing an exemplary hydraulic cylinder 12 including a cylinder head 14 having a cylindrical bore 16 therein in which an elongated rod 18 having an outer circumferential surface 20 is axially movable in the conventional manner. Cylinder head 14 of hydraulic cylinder 12 additionally includes a stepped opening 22 around bore 16 defined by an axially facing surface 24 and a radially inwardly facing surface 26, which stepped opening 22 is adapted for cooperatively receiving rod scraper 10 as shown.

Rod scraper 10 includes an elastomeric ring member 28 having a first axial end portion 30, an opposite second axial end portion 32, a circumferential radial outer surface 34, and a circumferential radial inner surface 36. Radial inner surface 36 defines a central aperture 38 extending axially through elastomeric ring member 28, which central aperture 38 is adapted for receiving rod 18 for axial movement therein. Radial inner surface 36 further importantly includes a circumferential scraper portion 40 extending radially inwardly into central aperture 38, scraper portion 40 having a generally frusto-conical cross-sectional shape and terminating at a radial inner most circumferential lip 42 positioned adjacent to first axial end portion 30. Circumferential lip 42 is positioned for circumferentially contacting outer circumferential surface 20 of rod 18 and scraping outer circumferential surface 20 during relative axial movement between rod 18 and rod scraper 10, particularly when rod 18 is being retracted into hydraulic cylinder 12 as denoted by the arrow 44.

Importantly, outer surface 34 of elastomeric ring member 28 has a curved portion 46 which is generally axially coextensive with scraper portion 40, and a metallic backing ring 48 is affixed to outer surface 34, backing ring 48 having a curved portion 50 located in overlaying relation to at least a substantial portion of curved portion 46 at least generally as shown in FIG. 2. Since curved portion 46 is generally axially coextensive with scraper portion 40, overlaying curved portion 50 of backing ring 48 is likewise generally axially coextensive with scraper portion 40. This is important because curved portion 50 of backing ring 48 is resiliently biased in the radial inward direction against curved portion 46 of elastomeric ring member 28 to urge lip 42 against rod 18, thereby enabling lip 42 to exert at least some radial inward pressure against outer circumferential surface 20 of rod 18 to provide desirable scraping characteristics.

Also importantly, metallic backing ring 48 is sufficiently resiliently biasable and flexible to allow at least some range of movement of rod 18 in the radial direction as denoted by arrow 52, while still maintaining scraper portion 40 in substantial circumferential scraping contact with outer circumferential surface 20 of rod 18. Additionally, metallic backing ring 48 includes an axial end portion 54 positioned adjacent to first axial end portion 30 of elastomeric ring member 28, which axial end portion 54 is effectively positioned to cover and protect elastomeric ring member 28 from contact with large debris adhered to or otherwise located on outer circumferential surface 20 of rod 18 as rod 18 is moved in the axial direction denoted by arrow 44. Also, axial end portion 54 and curved portion 50 of metallic backing ring 48 are substantially flush with first axial end portion 30 of elastomeric ring member 28, the flush relationship reducing the area available for debris such as dust, dirt, grime, and the like, to collect and accumulate so as to potentially ingress with rod 18 into hydraulic cylinder 12 past scraper 10.

Metallic backing ring 48 further includes a cylindrical outer surface portion 56 positioned to frictionally engage radially inwardly facing surface 26 of cylinder head 14 for maintaining rod scraper 10 in the mounted position as shown in stepped opening 22. In instances when oil or hydraulic fluid is able to leak past the primary seals (not shown) of hydraulic cylinder 12 and collect in the portion of stepped opening 22 between radial inner surface 36, scraper portion 40, and outer circumferential surface 20 of rod 18, because only a single scraper portion 40 is present, the oil or fluid will not be trapped and instead is able to pass between the lip 42 and surface 20 before reaching a pressure sufficiently high to push rod scraper 10 from its mounted position in stepped opening 22.

Turning to FIG. 3, another rod scraper 58 constructed and operable according to the teachings of the present invention is shown, like portions of rod scraper 58 and rod scraper 10 being identified with the same numerals. Rod scraper 58 is cooperatively receivable in a suitable mounting opening of a hydraulic cylinder, such as stepped opening 22 of cylinder head 14 of hydraulic cylinder 12 formed by axially facing surface 24 and radially inwardly facing surface 26. Rod scraper 58 when so mounted is positioned for contacting and scraping outer surface 20 of rod 18 located in cylindrical bore 16 of hydraulic cylinder 12 as rod 18 moves axially therein as explained above. Rod scraper 58 includes an elastomeric ring member 60 having a first axial end portion 62, an opposite second axial end portion 64, a circumferential radial outer surface 66, and a circumferential radial inner surface 68, radial inner surface 68 defining an axially extending aperture 38 extending through rod scraper 58 similarly to rod scraper 10. Also similar to rod scraper 10, radial inner surface 68 includes a scraper portion 40 extending radially inwardly into aperture 38, scraper portion 40 including a radial inner most circumferential lip 42 positioned adjacent to first axial end portion 62 of elastomeric ring member 60 for scraping outer circumferential surface 20 of rod 18 during relative axial movement therebetween, particularly when rod 18 is moving in the direction denoted by the arrow 44 as explained above.

Radial outer surface 66 includes a curved portion 70 generally axially coextensive with scraper portion 40, a metallic backing ring 72 being affixed to outer surface 66 and having a curved portion 74 located in overlaying relation to at least a substantial portion of curved portion 70 of the elastomeric ring member 60. Importantly, like curved portion 50 of metallic backing ring 48, curved portion 74 of metallic backing ring 72 is resiliently biased against curved portion 70 to urge lip 42 against outer circumferential surface 20 of rod 18. Metallic backing ring 72 additionally includes an axial end portion 76 which is located in a somewhat more flush relation to first axial end portion 62 of elastomeric ring member 60 compared to axial end portion 54 of rod scraper 10, to thereby provide somewhat better protection for elastomeric ring member 60 from contact with debris on rod 18. Metallic backing ring 72 additionally includes a cylindrical outer surface portion 78 adapted for frictional engagement with radially inwardly facing surface 26 of cylinder head 14 for mounting rod scraper 58 similarly as described above.

FIG. 4 shows still another rod scraper 80 constructed and operable according to the teachings of the present invention, like portions of rod scraper 80, rod scraper 58 and rod scraper 10 being identified with like numerals. Rod scraper 80 includes an elastomeric ring member 82 having a first axial end portion 84, an opposite second axial end portion 86, a circumferential radial outer surface 88, and a circumferential radial inner surface 90, radial inner surface 90 including a scraper portion 40 having a radial inner most circumferential lip 42 positioned adjacent to first axial end portion 84 for scraping a rod such as rod 18 (FIGS. 2 and 3) in the above described manner as the rod is moved axially with respect to rod scraper 80. Radial outer surface 88 includes a curved portion 92 generally axially coextensive with scraper portion 40, and a metallic backing ring 94 is fixed to radial outer surface 88. Again, like with rod scraper 10 and rod scraper 58, metallic backing ring 94 has a curved portion 96 located in overlaying relation to at least a substantial portion of curved portion 92 of radial outer surface 88 of elastomeric ring member 82, curved surface 96 being resiliently biasable against curved portion 92 to urge lip 42 against a rod such as the rod 18 as discussed above. Rod scraper 80 differs from rod scraper 10 and rod scraper 58 primarily in the location and orientation of first axial end portion 84 which is located axially inwardly of an axial end portion 98 of metallic backing ring 94, an important advantage of this being that axial end portion 98 is more outwardly positioned for providing better coverage and protection from contact with debris and the like for elastomeric ring member 82. Metallic backing ring 94 further includes a cylindrical outer surface portion 100 adapted to be cooperatively received in frictional engagement with a radially inwardly facing surface forming a stepped opening on a cylinder head or other component of a hydraulic cylinder, such as surface 26 of cylinder head 14 of hydraulic cylinder 12 (FIGS. 2 and 3).

Here, it should be recognized that rod scraper 10, rod scraper 58, and rod scraper 80 perform substantially similar rod scraping functions, functional differences such as the resilient biasing properties thereof being determined at least in some part by the elastomeric composition of the elastomeric ring member component thereof; certain dimensional parameters thereof, particularly the radial thickness of the elastomeric ring member; and the metallic composition and thickness of the metallic backing ring; as well as the diametrical fit of the rod scraper in the stepped opening or other mounting location for the rod scraper. Also, the flexibility of the backing ring to allow some radial movement of the rod is determined in part by the metallic composition and cross-sectional thickness of the backing ring, and the spatial relation of the curved portion of the backing ring to the mounting surface with which the backing ring is engaged.

It should additionally be noted that backing ring 48, backing ring 72, and backing ring 94, can be affixed to the respective elastomeric ring member 28, elastomeric ring member 60, and elastomeric ring member 82, using any suitable means, such as by molding, crimping, or using adhesives, just to name a few alternatives.

INDUSTRIAL APPLICABILITY

The present rod scraper has utility for a wide variety of applications, including for scraping rods, shafts and other members of hydraulic cylinders and the like. The present rod scraper also has particular utility wherein large items of debris such as dirt, mud, concrete, and the like, are found on the rod, shaft or the like and wherein some radial movement thereof is expected. Other aspects, objects and advantages of the present invention can be obtained from a study of the drawings, the disclosure and the appended claims.

What is claimed is:

1. A rod scraper comprising:
an elastomeric ring member having a first axial end portion, an opposite second axial end portion, a radial outer surface, and a radial inner surface, the radial inner surface defining a central aperture extending axially through the elastomeric ring member adapted for receiving a rod for axial movement relative thereto, the radial inner surface including a scraper portion extending radially inwardly into the central aperture, the scraper portion including a radial inner most circumferential lip positioned adjacent to the first axial end portion for scraping the rod when received in the aperture and moved axially relative thereto, the outer surface including a curved portion generally axially coextensive with the scraper portion; and
a metallic backing ring affixed to the outer surface of the elastomeric ring member having a curved portion in overlaying relation to at least a substantial portion of the curved portion of the outer surface of the elastomeric ring member, the curved portion of the backing ring being resiliently biasable against the curved portion of the outer surface of the elastomeric ring member to urge the radial inner most circumferential lip of the elastomeric ring member against the rod when received in the aperture of the elastomeric ring member, wherein the scraper portion of the radial inner surface of the elastomeric ring member has a generally frusto-conical cross-sectional shape.

2. A rod scraper, as set forth in claim 1, wherein the curved portion of the metallic backing ring is positioned for protecting the circumferential lip of the elastomeric ring member from contact with large debris on the rod during relative axial movement of the rod towards the rod scraper.

3. A rod scraper, as set forth in claim 1, wherein the curved portion of the backing ring is sufficiently resiliently biasable against the elastomeric ring member to maintain the radial inner most circumferential lip thereof in circumferential contact with the rod during relative radial movement of the rod and the rod scraper.

4. A rod scraper, as set forth in claim 1, wherein the rod scraper is mountable in a stepped opening defined by an annular cylinder head surface with at least a substantial portion of the curved portion of the metallic backing ring in spaced relation to the cylinder head surface.

5. A rod scraper comprising:
an elastomeric ring member having a first axial end portion, an opposite second axial end portion, a radial outer surface, and a radial inner surface, the radial inner surface defining a central aperture extending axially through the elastomeric ring member adapted for receiving a rod for axial movement relative thereto, the radial inner surface including a scraper portion extending radially inwardly into the central aperture, the scraper portion including a radial inner most circumferential lip positioned adjacent to the first axial end portion for scraping the rod when received in the aperture and moved axially relative thereto, the outer surface including a curved portion generally axially coextensive with the scraper portion; and
a metallic backing ring affixed to the outer surface of the elastomeric ring member having a curved portion in overlaying relation to at least a substantial portion of the curved portion of the outer surface of the elastomeric ring member, the curved portion of the backing ring being resiliently biasable against the curved portion of the outer surface of the elastomeric ring member to urge the radial inner most circumferential lip of the elastomeric ring member against the rod when received in the aperture of the elastomeric ring member, wherein the metallic backing ring comprises an axial end portion located axially outwardly of the first axial end portion of the elastomeric ring member.

6. A rod scraper comprising:

an elastomeric ring member having a first axial end portion, an opposite second axial end portion, a radial outer surface, and a radial inner surface, the radial inner surface defining a central aperture extending axially through the elastomeric ring member adapted for receiving a rod for axial movement relative thereto, the radial inner surface including a scraper portion extending radially inwardly into the central aperture, the scraper portion including a radial inner most circumferential lip positioned adjacent to the first axial end portion for scraping the rod when received in the aperture and moved axially relative thereto, the outer surface including a curved portion generally axially coextensive with the scraper portion; and a metallic backing ring affixed to the outer surface of the elastomeric ring member having a curved portion in overlaying relation to at least a substantial portion of the curved portion of the outer surface of the elastomeric ring member, the curved portion of the backing ring being resiliently biasable against the curved portion of the outer surface of the elastomeric ring member to urge the radial inner most circumferential lip of the elastomeric ring member against the rod when received in the aperture of the elastomeric ring member, wherein the metallic backing ring comprises an axial end portion located in generally flush relation with the first axial end portion of the elastomeric ring member.

* * * * *